United States Patent
Meyer

(10) Patent No.: US 12,357,000 B2
(45) Date of Patent: Jul. 15, 2025

(54) HIGH-MOISTURE, ALL-NATURAL, SHELF-STABLE FOOD PRODUCT

(71) Applicant: Texas Tech University System, Lubbock, TX (US)

(72) Inventor: Richard Schlomer Meyer, Harrison, ID (US)

(73) Assignee: Texas Tech University System, Lubbock, TX (US)

( * ) Notice: Subject to any disclaimer, the term of this patent is extended or adjusted under 35 U.S.C. 154(b) by 198 days.

(21) Appl. No.: 17/251,878

(22) PCT Filed: Jun. 13, 2019

(86) PCT No.: PCT/US2019/036956
§ 371 (c)(1),
(2) Date: Dec. 14, 2020

(87) PCT Pub. No.: WO2019/241511
PCT Pub. Date: Dec. 19, 2019

(65) Prior Publication Data
US 2021/0251262 A1    Aug. 19, 2021

Related U.S. Application Data

(60) Provisional application No. 62/685,657, filed on Jun. 15, 2018.

(51) Int. Cl.
*A23B 4/044* (2006.01)
*A23B 2/30* (2025.01)
(Continued)

(52) U.S. Cl.
CPC .............. *A23B 2/90* (2025.01); *A23B 2/30* (2025.01); *A23B 2/405* (2025.01); *A23B 2/708* (2025.01);
(Continued)

(58) Field of Classification Search
CPC ... A23L 3/40; A23L 3/10; A23L 3/165; A23L 3/3418; A23L 3/02–3/14; A23B 4/0056;
(Continued)

(56) References Cited

U.S. PATENT DOCUMENTS 2,439,180 A * 4/1948 McKee ................. A23B 4/031
99/473
3,519,438 A * 7/1970 Connick .............. A23B 4/0526
426/641
(Continued)

FOREIGN PATENT DOCUMENTS

| CH | 432215 A | 3/1967 |
| GB | 2036533 A | 7/1980 |
| KR | 100590802 B1 | 6/2006 |

OTHER PUBLICATIONS

Food Microbiology Fourth Edition, Wiliam Frazier and Dennis Westhoff, p. 111, McGraw-Hill Inc (Year: 1988).*
(Continued)

*Primary Examiner* — Drew E Becker
(74) *Attorney, Agent, or Firm* — Edwin S. Flores; Daniel J. Chalker; Chalker Flores, LLP

(57) ABSTRACT

A method for preparing a shelf-stable, high-moisture food product is disclosed, including drying the pre-pasteurized food item to a water activity between 0.86 and 0.94; and vacuum packing the dried food item in an oxygen impermeable and water-impermeable membrane.

5 Claims, 2 Drawing Sheets

(51) Int. Cl.
    *A23B 2/40*           (2025.01)
    *A23B 2/708*         (2025.01)
    *A23B 2/90*           (2025.01)
    *A23B 4/005*         (2006.01)
    *A23B 7/005*         (2006.01)
    *A23B 7/02*           (2006.01)
    *A23B 9/02*           (2006.01)
    *A23B 9/08*           (2006.01)
    *A23B 9/20*           (2006.01)
    *B65B 25/00*         (2006.01)
    *B65B 25/04*         (2006.01)
    *B65B 25/06*         (2006.01)

(52) U.S. Cl.
    CPC ............ *A23B 4/0056* (2013.01); *A23B 4/044* (2013.01); *A23B 7/0056* (2013.01); *A23B 7/02* (2013.01); *A23B 9/02* (2013.01); *A23B 9/08* (2013.01); *A23B 9/20* (2013.01); *B65B 25/001* (2013.01); *B65B 25/041* (2013.01); *B65B 25/062* (2013.01); *B65B 25/067* (2013.01)

(58) Field of Classification Search
    CPC ....... A23B 7/005; A23B 4/044–4/0523; A23B 7/0056; A23B 7/02; A23B 9/02; A23B 9/08; A23B 9/20; A23B 4/0053; A23B 2/90; A23B 2/30; A23B 2/405; A23B 2/708; B65B 25/001; B65B 25/041; B65B 25/062; B65B 25/067
    See application file for complete search history.

(56) References Cited

U.S. PATENT DOCUMENTS

| | | | | |
|---|---|---|---|---|
| 3,966,980 A * | 6/1976 | McGuckian | ........... | A23B 4/068 426/418 |
| 3,985,904 A * | 10/1976 | Bernotavicz | ........... | A23K 30/00 426/805 |
| 4,066,798 A * | 1/1978 | Follett | .................. | B65B 25/067 426/414 |
| 4,239,785 A * | 12/1980 | Roth | ........................ | A23P 30/10 426/513 |
| 4,265,918 A * | 5/1981 | Kueper | .................... | A23B 4/03 426/641 |
| 4,384,009 A * | 5/1983 | Lewis | ...................... | A23B 4/03 426/465 |
| 4,496,597 A * | 1/1985 | Reges | ...................... | A23B 7/022 426/402 |
| 4,680,190 A * | 7/1987 | Spiel | ...................... | A23B 7/0053 426/640 |
| 4,806,372 A | 2/1989 | Strumskis et al. | | |
| 4,820,536 A * | 4/1989 | Lippincott | .............. | B65B 29/08 383/111 |
| 5,110,609 A * | 5/1992 | Lewis | .................... | A23B 7/148 426/465 |
| 5,250,310 A * | 10/1993 | Fujino | .................. | B65B 25/067 426/396 |
| 5,300,312 A * | 4/1994 | Lusas | ............. | C12Y 304/22002 426/802 |
| 5,356,649 A * | 10/1994 | LaMotta | ............... | A23L 3/3418 426/396 |
| 5,397,587 A | 3/1995 | Thompson et al. | | |
| 5,437,885 A * | 8/1995 | Lusas | .................... | A23L 13/426 426/802 |
| 5,731,029 A * | 3/1998 | Karwowski | ............ | A23K 50/42 426/805 |
| 5,972,397 A | 10/1999 | Durance et al. | | |
| 6,099,881 A | 8/2000 | Hanson | | |
| 6,319,527 B1 * | 11/2001 | Purser | ..................... | A23L 13/48 426/523 |
| 6,884,455 B2 | 4/2005 | Doumoto et al. | | |
| 9,060,523 B1 * | 6/2015 | Buller-Colthurst | ....... | A23L 5/13 |
| 2001/0046539 A1 * | 11/2001 | Turner | ................. | A23B 4/0056 426/643 |
| 2003/0017254 A1 * | 1/2003 | Fulbright | .............. | A23L 13/426 426/646 |
| 2004/0067298 A1 * | 4/2004 | Slinde | ..................... | A23L 17/65 426/643 |
| 2004/0146613 A1 * | 7/2004 | Diebel | ................... | A23B 4/033 426/129 |
| 2004/0156960 A1 * | 8/2004 | Villota | .................... | A23B 7/10 426/325 |
| 2004/0247763 A1 * | 12/2004 | Shull | ........................ | A23B 4/20 426/523 |
| 2005/0074540 A1 * | 4/2005 | Machado Neto | ....... | A23L 13/60 426/646 |
| 2005/0084571 A1 * | 4/2005 | Keeler | ..................... | A23B 4/00 426/129 |
| 2005/0163912 A1 * | 7/2005 | White | ..................... | A23B 4/03 426/641 |
| 2005/0186312 A1 * | 8/2005 | Loh | ......................... | A23L 19/09 426/326 |
| 2008/0171117 A1 | 7/2008 | Mixon et al. | | |
| 2009/0047394 A1 * | 2/2009 | Willcocks | ............ | A01K 5/0121 426/106 |
| 2009/0087516 A1 * | 4/2009 | Tilsen | ..................... | A23B 4/03 426/56 |
| 2010/0015296 A1 * | 1/2010 | Meyer | .................... | A23P 20/25 426/138 |
| 2010/0040746 A1 * | 2/2010 | Shull | ....................... | A23B 4/20 426/281 |
| 2012/0040062 A1 * | 2/2012 | Srsen | ...................... | A23B 4/044 426/243 |
| 2012/0100273 A1 * | 4/2012 | Guillaud | ............... | B65B 25/067 426/393 |
| 2013/0089648 A1 * | 4/2013 | Meyer | .................. | A23B 4/0053 426/465 |
| 2016/0270432 A1 * | 9/2016 | Lin | ............. | A23L 3/02 |
| 2017/0027202 A1 * | 2/2017 | Timberlake | ............. | A23L 13/70 |
| 2017/0354158 A1 * | 12/2017 | Shie | ..................... | A23L 3/0155 |
| 2018/0077956 A1 * | 3/2018 | Harkema | ................. | A23L 13/72 |
| 2019/0159486 A1 * | 5/2019 | Cheung | ..................... | A23L 5/13 |
| 2019/0200655 A1 * | 7/2019 | Goodman | ................ | A23B 4/06 |
| 2020/0253244 A1 * | 8/2020 | Wang | ....................... | A23L 3/36 |

OTHER PUBLICATIONS

Supplemental European Search Report [EP 19818876.5] dated Feb. 21, 2022.

Breidt Jr., Fred et al. "Determination of 5-Log Reduction Times for Food Pathogens in Acidified Cucumbers during Storage at 10 and 25 degree C" Journal of Food Protection, vol. 70, No. 11, 2007, pp. 2638-2641.

International Search Report and Written Opinion, PCT/US19/36956 [ISA/US] dated Aug. 15, 2019.

* cited by examiner

HIGH-MOISTURE, ALL-NATURAL, SHELF-STABLE FOOD PRODUCT

CROSS-REFERENCE TO RELATED APPLICATIONS

This application claims priority to and is the National Stage of International Application No. PCT/US2019/036956, filed on Jun. 13, 2019 and claims priority to U.S. Provisional Application Ser. No. 62/685,657, filed Jun. 15, 2018, the entire contents of which are incorporated herein by reference.

STATEMENT OF FEDERALLY FUNDED RESEARCH

None.

TECHNICAL FIELD OF THE INVENTION

The present invention relates in general to the field of food preparation and preservation. In particular, the present invention relates preparation and preservation of shelf-stable, high-moisture, all-natural food products.

BACKGROUND OF THE INVENTION

Without limiting the scope of the invention, its background is described in connection with the preparation and preservation of snack foods.

Current dried foods such as dried fruit and jerky are tough and hard to chew and generally have preservatives such as nitrites, sulfites, sodium benzoate, calcium propionate, nitrogen flush or carbon dioxide flush with an oxygen absorber, etc., added to make them shelf-stable. The high moisture foods (0.89 water activity), such as steak strips or meat strips, are loaded with unnatural preservatives to prevent bacterial, mold and yeast growth plus they are packed with a nitrogen flush or carbon dioxide flush with an oxygen absorber.

Natural preservatives such as cultured sugar contains propionic acid, but it has been found to have terrible flavor and tends to toughen the meat. When these natural preservatives were used on steak strips (plus potassium sorbate on the surface to prevent mold growth), in amounts effective to eliminate bacterial growth, it had a detectable cardboard-like off-flavor. Further, as a product ages with these so-called natural preservatives (whether with propionic acid or sodium propionate), these cause the meat to become dryer, tougher, and crumbly. That meat products become dryer, tougher, and crumbly with age happens in all jerky products when an acidulant is used (e.g., BBQ flavor with an acid tanginess). Thus, there is a need to overcome these problems with the use of natural preservatives.

One such invention is taught in U.S. Pat. No. 6,099,881, issued to Hansen, which is said to teach a method of curing meat, or other food products, using nitrogen dioxide gas. Hansen teaches that the food product is exposed to nitrogen dioxide gas at a concentration in excess of 0.4 ppm, and the nitrogen dioxide gas reacts with moisture in the food product to produce nitrous acid that diffuses throughout the product to cure the product and produce the pink "cured" color pigment. Alternatively, the nitrogen dioxide gas is dissolved in water to produce a solution containing nitrous acid, and the solution is injected into the food product to produce the cured color pigment. Thus, the nitrous acid is a preservative added to the meat product.

Another such invention is taught in U.S. Pat. No. 6,319,527, issued to Purser, which is said to teach a method of preparing a uniformly tender meat product having an extended shelf life by: selecting one or more meat ingredients wherein the muscle weight is comprised of whole protein tissue fibers, such as beef or pork, and mixing an acidulent with the meat to form a pretenderized meat product, thus acid cooking the meat. Subsequently, the pretenderized meat product is mixed with an enzymatic tenderizer and cooked. The finished product is typically packaged in an oxygen-impermeable film, which also contains a microbe-inhibiting atmosphere and an oxygen-moisture scavenging agent.

A need exists for a food product that has no preservatives, high moisture content so that it is soft and easy to chew, and that requires no gas flushing and no oxygen absorber.

SUMMARY OF THE INVENTION

In some embodiments of the disclosure, a method for preparing a shelf-stable, high-moisture food product is disclosed as including drying a pre-pasteurized food item to a water activity between 0.86 and 0.94; and vacuum-packing the dried food item in an oxygen impermeable and water-impermeable membrane. In one aspect, the food item comprises beef, chicken, fish, fruit, vegetable, nuts, seeds, or a blended food. In another aspect, the method further includes pasteurizing the vacuum-packed food item. In another aspect, the method further includes pre-pasteurizing the raw food item prior to the drying step. In another aspect, the method steps are performed in a continuous production line. In another aspect, the food item is dried to a water activity between 0.88 and 0.92. In another aspect, the food item is dried to a water activity of about 0.90. In another aspect, the food item is dried with an internal temperature for a sufficient time to pasteurize the food item. In another aspect, the food item is dried with a final internal temperature of 160° F. for one minute. In another aspect, the food item is dried with a final internal temperature of 165° F. for one second. In another aspect, the food item is dried with a final internal temperature of 165° F. In another aspect, the food item is pasteurized in a water bath and achieves a final temperature of at least 160° F. for one minute. In another aspect, the food item is pasteurized in a water bath and achieves a final temperature of at least 165° F. for one second. In another aspect, no preservatives are used. In another aspect, no gas flushing is performed. In another aspect, no oxygen absorber is added. In another aspect, the method further includes treating the food item with one or more natural enzyme inhibitors. In another aspect, the method further comprises heating the product to at least 77° C. for a time sufficient to kill *Salmonella* and *Listeria* with at least a 5.0 log kill.

In some embodiments of the disclosure, a method of preparing a shelf-stable, high-moisture food product using a continuous production line is disclosed as including optionally pre-pasteurizing a raw food item: drying the pre-pasteurized food item to a water activity between 0.86 and 0.94; and vacuum-packing the dried food item in an oxygen impermeable and water-impermeable membrane.

In some embodiments of the disclosure, a method for preparing a shelf-stable, high-moisture food product is disclosed, including providing a raw food item in a raw state; optionally pre-pasteurizing the raw food item; preparing a brine; blending the food item and the brine by tumbling; letting the food item set in the brine; removing the food item from the brine; placing the food item in a smokehouse; removing the food item from the smokehouse when a water activity of the food item is 0.90 or greater; letting the food item cool; vacuum-packing the food item in an oxygen-impermeable and moisture-impermeable film; and pasteurizing the food item by placing the food item, now vacuum-packed, in a hot water bath. In another aspect, the method further comprises heating the product to at least 77° C. for a time sufficient to kill *Salmonella* and *Listeria* with at least a 5.0 log kill.

In some embodiments of the disclosure, a shelf-stable, high-moisture food product is disclosed as including an item of beef, chicken, fish, fruit, vegetable, or a blended item that has been optionally pre-pasteurized in a raw state, dried to a water activity between 0.86 and 0.94, vacuum-packed in an oxygen impermeable and water-impermeable membrane. In one example, drying can also be done by simple air-drying or Enwave's microwave vacuum drying—especially for fruits and vegetables. A post-process pasteurization takes care of any contamination from these air-drying alternatives. In one aspect, the food item comprises beef, chicken, fish, fruit, vegetable, nuts, seeds, or a blended food. In another aspect, the item is pasteurized after vacuum-packing. In another aspect, the method steps are performed in a continuous production line. In another aspect, the food item is dried to a water activity between 0.88 and 0.92. In another aspect, the food item is dried to a water activity of about 0.90. In another aspect, the food item is dried with an internal temperature for a sufficient time to pasteurize the food item. In another aspect, the food item is dried with a final internal temperature of 160° F. for one minute. In another aspect, the food item is dried with a final internal temperature of 165° F. for one second. In another aspect, the food item is dried with a final internal temperature of 165° F. In another aspect, the food item is pasteurized in a water bath and achieves a final temperature of at least 160° F. for one minute. In another aspect, the food item is pasteurized in a water bath and achieves a final temperature of at least 165° F. for one second. For example, a post-process pasteurization in the package can also accomplished in a heated, continuous tunnel (or steam tunnel), or an air impingement oven (continuous flow of hot air). What is important is to heat the product in the package at a set temperature and holding for a time sufficient to achieve pasteurization. For example, a hot water bath provides energy efficiency and complete, uniform heat transfer (no cold spots). In another aspect, no preservatives are used. In another aspect, no gas flushing is performed. In another aspect, no oxygen absorber is added. In another aspect, the food item has been treated with one or more natural enzyme inhibitors. In another aspect, the method further comprises heating the product to at least 77° C. for a time sufficient to kill *Salmonella* and *Listeria* with at least a 5.0 log kill.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Figure 1:
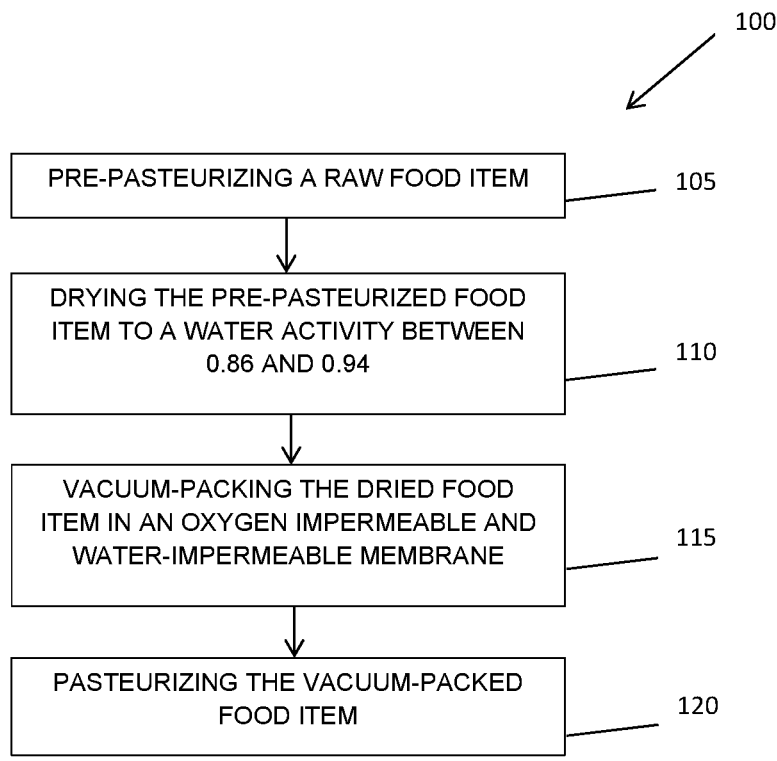
FIG. 1 shows a flowchart of a method embodiment of the present invention.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention is and produces an all-natural food that has no preservatives, that has a texture is soft and easy to chew, and that requires no gas flushing and an oxygen absorber. This process also allows the moisture to go higher (0.90 to 0.94) to enhance the moistness and to generate a softer, more pleasant texture that is easier to chew.

As used herein, the term "water activity" or "$a_w$," refers to a partial vapor pressure of water in a substance divided by the standard state partial vapor pressure of water. In the field of food science, the standard state is most often defined as the partial vapor pressure of pure water at the same temperature. As such, pure distilled water has a water activity of exactly one. As temperature increases, $a_w$ typically increases, except in some products with crystalline salt or sugar. Substances with a higher $a_w$ tend to support more microorganisms, for example, bacteria usually require at least 0.91, and fungi at least 0.7. Water activity can be understood as the amount of water available for hydration of materials (water activity=water availability). As such, when the water is all available, $a_w=1$, and when none is available, $a_w=0$. See also, www.fda.gov/inspections-compliance-enforcement-and-criminal-investigations/inspection-technical-guides/water-activity-aw-foods, relevant portions incorporated herein by reference.

The food product of the present invention can include meat, seafood, fruit, vegetable, nuts, seeds, or a blended food product.

The present invention encompasses a number of processes for producing a shelf-stable, high-moisture food snack. These processes include but are not limited to the following:

(1) A food is pre-pasteurized, an initial pasteurization in which all microbes except spores are killed, and dried to a water activity between 0.86 and 0.94, vacuum packed in a water and oxygen impermeable membrane, then subjected to a pasteurization process in the package.

(2) The food product is dried in a smokehouse with an internal temperature and time sufficient to pasteurize the product and dried to a water activity between 0.86 and 0.94, vacuum packed in a water and oxygen impermeable membrane, then subjected to a pasteurization process.

(3) The food product is dried in a smokehouse with a final internal temperature achieving at least 160° F. for one minute and dried to a water activity between 0.86 and 0.94, vacuum packed in a water and oxygen impermeable membrane, then subjected to a pasteurization process.

(4) The food product is dried in a smokehouse with a final internal temperature, more preferably, achieving 165° F. for one second and dried to a water activity between 0.86 and 0.94, vacuum packed in a water and oxygen impermeable membrane, then subjected to a pasteurization process.

(5) The food product is dried in a smokehouse with a final internal temperature, more preferably, achieving 165° F., and dried to a water activity, more preferably, between 0.88 and 0.92, vacuum packed in a water and oxygen impermeable membrane, then subjected to a pasteurization process.

(6) The food product is dried in a smokehouse with a final internal temperature, more preferably, achieving 165° F. and dried to a water activity, more preferably, between 0.88 and 0.92, vacuum packed in a water and oxygen impermeable membrane then subject to a pasteurization process where the pasteurization process is a commercial heating process such as a water bath, with the product achieving an internal temperature of at least 160° F. for one minute or 165° F. for one second.

In processing the food snack in accordance with the present invention, either a pre-pasteurization or a pasteurization after vacuum-packing is required, but if the product is pasteurized after vacuum-packing, the pre-pasteurization is optional. One skilled in the art of food processing will recognize that this may be the case in scenarios described herein in which both pre-pasteurization and pasteurization after vacuum-packing is discussed.

In one non-limiting exemplary process, beef is prepared according to an embodiment of the present invention as described in this table:

|     | Surface tumble on brine |     | Inject brine |
| --- | --- | --- | --- |
| 1A | Slice top round at 2.5 cm (1 inch) across the grain and 12 mm (1/2 inch) thick and natural length | 1B | Use whole top rounds and don't slice until after pumped. |
| 2A | Blend brine formula and place strips into the brine. | 2B | Blend brine formula and inject at a 33% pump |
| 3A | Blend together with a slow tumble for 5 minutes. | 3B | Vacuum (10") tumble pumped top rounds (4) at the rate of 5 RPM's for 1 hour. |
| 4A | Let set over night in the brine. | 4B | Let set over night in the brine at 40° F.; no retumble was needed; no free brine. Slice top round at 2.5 cm (1 inch) across the grain and 12 mm (1/2 inch) thick and natural length. |
| 5A | Place strips on plastic grid on a flat tray with strips not touching. | 5B | Place strips on plastic grid on a flat tray with strips not touching. |
| 6A | Place on a trays on a rack and move into the smokehouse. | 6B | Place on a trays on a rack and move into the smokehouse. |
| 7A | Start smokehouse process according to schedule. | 7B | Start smokehouse process according to schedule. |
| 8A | Pull strips near the end of the smokehouse schedule to see how close to 0.90 water activity. | 8B | Pull strips near the end of the smokehouse schedule to see how close to 0.90 water activity. |
| 9A | When 0.90 water activity achieved, let cool then individually vacuum pack each strip in an oxygen & moisture barrier film. | 9B | When 0.90 water activity achieved, let cool then individually vacuum pack each strip in an oxygen & moisture barrier film. |
| 10A | Place the vacuum packed strips into a hot water bath (180° F.) for a period sufficient to fully pasteurize the strip. | 10B | Place the vacuum packed strips into a hot water bath (180° F.) for a period sufficient to fully pasteurize the strip. |
| 11A | Pull samples after 10 minutes and 20 minutes. | 11B | Pull samples after 10 minutes and 20 minutes. |
| 12A | Conduct micro testing on samples pulled at various times to confirm that full pasteurization has been achieved. | 12B | Conduct micro testing on samples pulled at various times to confirm that full pasteurization has been achieved. |

In a non-limiting exemplary process embodiment, two preparations are made as described in this table:

| Ingredient | % | A | B |
| --- | --- | --- | --- |
| Beef, Top Round | 75.00% | 10.27 lbs. | 33% pump into top rounds |
| Brine: | 3.423 lbs. |  | 50 pounds |
| Nitrite cure: nitrites or celery powder (also called fermented celery juice or swiss chard powder), (120 ppm nitrite) |  | 8.94 grams | 130.64 grams |

-continued

| Ingredient | % | A | B |
|---|---|---|---|
| Brown sugar | 10.00% | 621.11 grams | 15 lbs. |
| sea salt # 57 | 1.40% | 78.02 | real salt 2.512 lbs. |
| black pepper, fine, 60 mesh | 0.12% | 7.453 | 0 |
| Garlic powder | 0.30% | 18.633 | 272.16 grams |
| onion powder | 0.20% | 12.422 | 181.44 grams |
| Bay leaf, ground | 0.10% | 6.211 | 90.816 grams |
| Maxarome yeast extract | 0.10% | 6.211 | 90.816 grams |
| Clear valley sunflower oil | 0.40% | 24.8445 | 0.8 lbs. |
| smoke (0.3 %) | | burn chips; 1 hour burn hickory | burn chips; 1 hour burn hickory |
| peach flavor 582483 | 0.0010% | 0.062 | 0.907 grams |
| mango flavor 522473 | | 0 | 0 |
| water | 12.00% | 745.337 | 24 lbs. |
| Natural Umami flavor | 0.30% | 18.633 | 272.16 grams |
| | 99.9210% | | |

The following table shows a non-limiting exemplary smokehouse schedule for testing of a process embodiment of the present invention:

| Stage | Cook Time (minutes) | Dry Bulb | Wet Bulb | RH | Exhaust | Steam | Special Notes on Process |
|---|---|---|---|---|---|---|---|
| 1 | 10 | 160 | 104 | 25% | on | off | |
| 2 | 10 | 170 | 121 | 25% | on | on | |
| 3 | 10 | 180 | 128 | 25% | on | on | |
| 4 | 10 | 195 | 140 | 25% | on | on | |
| 5 | 30 | 205 | 165 | 40% | on | on | stop when meat internal temperature hits 160° F. |
| 6 | 10 | 180 | 134 | 30% | on | on | |
| 7 | 40 | 180 | 134 | 30% | on | on | |
| 8 | 10 | 170 | 126 | 30% | on | on | |
| 9 | 10 | 170 | 126 | 30% | on | on | |
| 10 | 10 | 160 | 109 | 20% | on | on | |
| 11 | 30 | 160 | 109 | 20% | on | on | pull at 0.90 water activity |
| 12 | open | 160 | 109 | 20% | off | off | |

The following table illustrates water activities in a non-limiting, exemplary test of a process embodiment of the present invention:

| Pull | time of pull | time at 180° F. in water bath (minutes) | water activity | hit target |
|---|---|---|---|---|
| 1:00 AM | 1:45 | 10 | 0.9606 | no |
| 1 b | 1:45 | 10 | 0.9230 | yes |
| 2 a | 2:25 | 10 | 0.9036 | yes |
| 2 b | 2:25 | 10 | 0.9044 (thick) | yes |
| 3 a | 3:00 | 10 | 0.9225 | yes |
| 3 b | 3:00 | 10 | 0.9146 | yes |
| 4 a | 3:30 | 10 | 0.8700 (thin) | yes |
| 4 b | 3:30 | 10 | 0.9252 (thick) | yes |
| 5 a | 4:00 | 10 | 0.9126 | yes |
| 5 b | 4:00 | 10 | 0.8995 | yes |
| 6 | 4:30 | 10 | 0.9011 | yes |
| Target water activity: 0.89 to 0.93 | | | | |

FIG. 1 shows a flowchart of a method embodiment of the present invention. Method 100 for preparing a shelf-stable, high-moisture food product begins with block 105, which includes pre-pasteurizing a raw food item. Method 100 continues with drying the pre-pasteurized food item to a water activity between 0.86 and 0.94 in block 110. Block 115 includes vacuum-packing the dried food item in an oxygen impermeable and water-impermeable membrane. In block 120, the vacuum-packed food item is pasteurized. Method 100 may also be performed using an aseptic, continuous production line, with no human intervention and no exposure to microbes, in which case post-process pasteurization may not be necessary. Some foods, such as fruits, may require the inclusion of one or more natural enzyme inhibitors to prevent browning, such as gluconic acid at 0.1% to 0.5% or glucose oxidase with at least 0.1% to 0.5% glucose present, which produces gluconic acid and eliminates oxygen.

Figure 2:
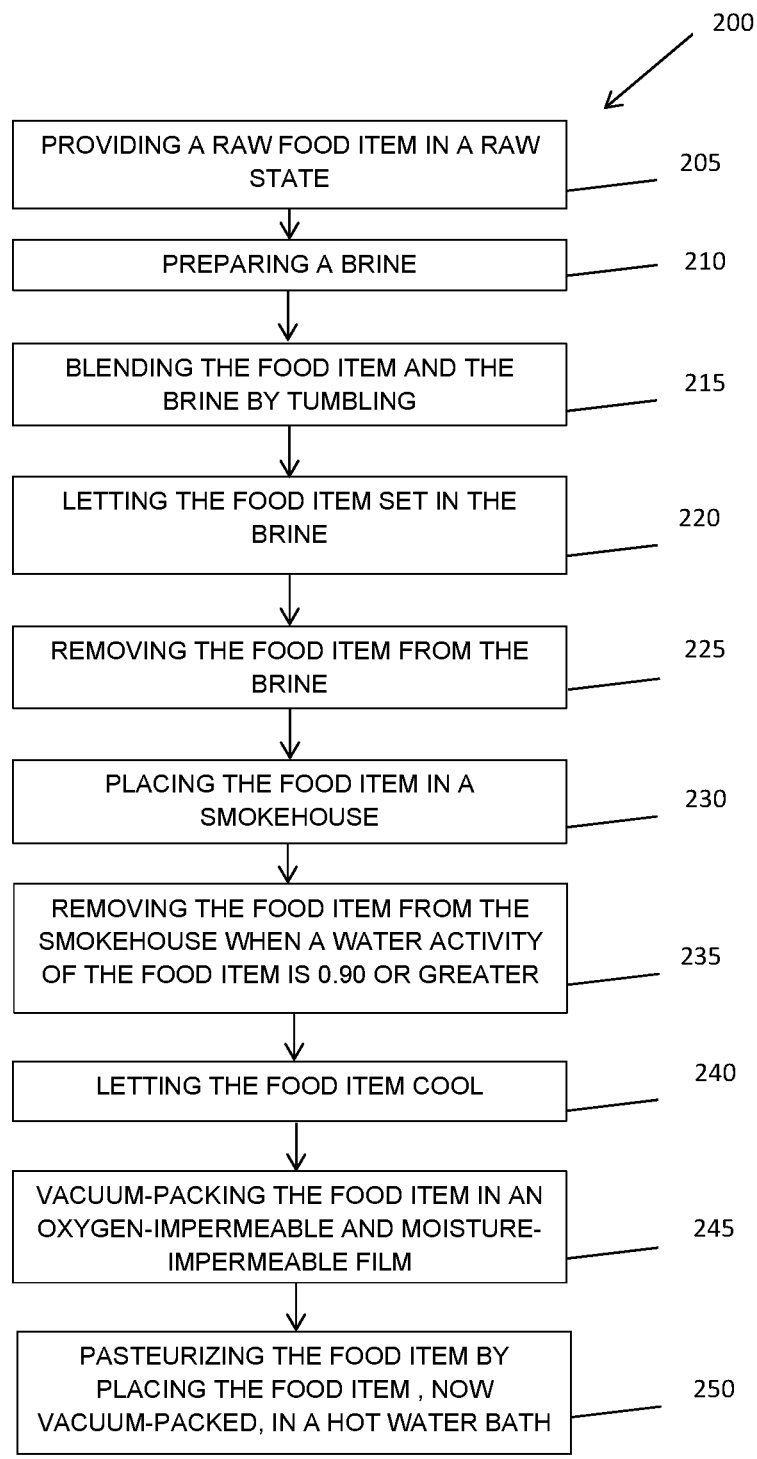
FIG. 2 shows a flowchart of another method embodiment of the present invention.

FIG. 2 depicts a flowchart of a method embodiment of the present invention. Method 200 for preparing a shelf-stable, high-moisture food product includes providing a food item in a raw state in block 205 and preparing a brine in block 210. Block 215 includes blending the food item and the brine by tumbling, block 220 includes letting the food item set in the brine, and block 225 includes removing the food item from the brine. Placing the food item in a smokehouse is included in block 230. In block 235, removing the food item from the smokehouse when a water activity of the food item is 0.90 or greater. In block 240, the food item is allowed to cool. Vacuum-packing the food item in an oxygen-impermeable and moisture-impermeable film is included in block 245. Finally, the food is pasteurized by placing the food item, now vacuum-packed, in a hot water bath in block 250. Method 200 may also be performed using an aseptic, continuous production line, with no human intervention and no exposure to microbes, in which case post-process pasteurization may not be necessary. Some foods, such as fruits, may require the inclusion of one or more natural enzyme inhibitors to prevent browning, such as gluconic acid at 0.1% to 0.5% or glucose oxidase with at least 0.1% to 0.5% glucose present, which produces gluconic acid and eliminates oxygen.

In one example, drying can also be done by simple air-drying or Enwave's microwave vacuum drying—especially for fruits and vegetables. A post-process pasteurization takes care of any contamination from these air-drying alternatives. For example, a post process pasteurization in the package can also accomplished in a heated, continuous tunnel (or steam tunnel), or an air impingement oven (continuous flow of hot air). What is important is to heat the product in the package at a set temperature and holding for a time sufficient to achieve pasteurization. For example, a hot water bath provides energy efficiency and complete, uniform heat transfer (no cold spots).

Using the present invention it was found that with just 6 minutes at 77° C. for an 11 mm thick steak strip, at 0.89 to 0.90 water activity, to get a 5.0 to 5.5 log kill of both *Salmonella* and *Listeria*. Depending on the thickness of the meat, the time may be increased or decreased, e.g., 1, 2, 3, 4, 5, 6, 7, 8, 9, 10, 12, 15, 20 or 25 minutes.

In addition, the present invention can be used for process for fruit snacks (e.g. mangos, strawberries, etc.) and vegetables (e.g. carrots), in which the final fruit/vegetable has a soft texture, easy to chew shelf-stable snack.

The skilled artisan will recognize that the present invention provides an all-natural food that has no preservatives, that has a texture is soft and easy to chew, and that requires no gas flushing and an oxygen absorber. This process also allows the moisture to go higher (0.90 to 0.94) to enhance the moistness and to generate a softer, more pleasant texture and softer chewability.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112 (f) as it exists on the date of filing hereof unless the words "means for" or "step for" are explicitly used in the particular claim.

What is claimed is:

1. A method for preparing a shelf-stable, high-moisture food product, comprising:
   a first pasteurizing step of a food item to kill microbes except spores comprising smoking the pasteurized food item to a water activity between 0.88 and 0.92, wherein the food product is at least one of: smoked to a final internal temperature of 160° F. for one minute; smoked to a final internal temperature of 165° F. for one second; or smoked to a final internal temperature of 165° F.;
   vacuum-packing the smoked food product in an oxygen impermeable and water-impermeable membrane, wherein no preservatives are added, no gas flushing is performed, and no oxygen absorber is added and having a water activity between 0.88 and 0.92; and
   a second pasteurizing step of the food item in the package, wherein the food item in the package is shelf-stable and has a water activity between 0.88 and 0.92.

2. The method of claim 1, wherein the food product comprises beef, chicken, fish, fruit, vegetable, nuts, seeds, or a blend thereof.

3. The method of claim 1, wherein the second pasteurizing step is further defined as heating the food product to at least 77° C. to kill *Salmonella* and *Listeria* with at least a 5.0 log kill.

4. A method of preparing a shelf-stable, high-moisture food product, consisting essentially of:
- a first pasteurizing step of a raw food item to kill microbes except spores by smoking the pasteurized food item to a water activity 0.88 to 0.92, wherein the food product is at least one of: smoked to a final internal temperature of 160° F. for one minute; smoked to h a final internal temperature of 165° F. for one second; or smoked to a final internal temperature of 165° F.; and
- vacuum-packing the dried smoked item in an oxygen impermeable and water-impermeable membrane, wherein no preservatives are added, no gas flushing is performed, and no oxygen absorber is added, and having a water activity between 0.88 and 0.92; and
- after vacuum-packing the smoked food item, then a second pasteurizing step of the food item in the package, wherein the food item in the package is shelf-stable and has a water activity between 0.88 and 0.92.

5. A method for preparing a shelf-stable, high-moisture food item, comprising:
- providing a raw food item in a raw state;
- preparing a brine;
- blending the food item and the brine by tumbling;
- letting the food item set in the brine;
- removing the food item from the brine;
- placing the food item in a smokehouse; wherein the food item is at least one of: smoked with a final internal temperature of 160° F. for one minute; smoked with a final internal temperature of 165° F. for one second; or smoked with a final internal temperature of 165° F.;
- removing the food item from the smokehouse when a water activity of the food item is between 0.88 and 0.92;
- letting the food item cool;
- vacuum-packing the food item in an oxygen-impermeable and moisture-impermeable film; and a pasteurizing step of the food item in the package; wherein no preservatives are added, no gas flushing is performed, and no oxygen absorber is added, wherein the food item in the package is shelf-stable and has a water activity between 0.88 and 0.92.

* * * * *